United States Patent

Hoffmann et al.

Patent Number: 5,891,227
Date of Patent: Apr. 6, 1999

[54] AQUEOUS DYE PREPARATIONS

[75] Inventors: Dietrich Hoffmann, Rödersheim-Gronau; Ulrike Schlösser, Ludwigshafen; Erwin Czech, Biblis; Walter Kurtz, Bad Dürkheim; Karin Heidrun Beck, Ludwigshafen, all of Germany; Doug R. Campbell, West Sandlake, N.Y.; Helmut Bellaire; Horst Belde, both of Ludwigshafen, Germany

[73] Assignee: BASF Aktiengesellschaft, Ludwigshafen, Germany

[21] Appl. No.: 911,050

[22] Filed: Aug. 14, 1997

[30] Foreign Application Priority Data

Aug. 20, 1996 [DE] Germany ............ 196 33 332.6

[51] Int. Cl.⁶ .................................... C09D 11/02
[52] U.S. Cl. ...................... 106/31.28; 106/31.52; 8/662; 534/689
[58] Field of Search ............... 106/31.28, 31.52; 8/662; 534/689

[56] References Cited

U.S. PATENT DOCUMENTS

| | | | |
|---|---|---|---|
| 4,218,252 | 8/1980 | Yokoyama | 106/31.28 |
| 4,940,783 | 7/1990 | Stingelin | 106/31.52 |
| 5,431,723 | 7/1995 | Bermes et al. | 106/31.52 |
| 5,531,818 | 7/1996 | Lin et al. | 106/31.28 |
| 5,604,276 | 2/1997 | Suga | 106/31.28 |

FOREIGN PATENT DOCUMENTS

| | | |
|---|---|---|
| 34 45 225 | 6/1986 | Germany. |
| 42 27 591 | 2/1994 | Germany. |

*Primary Examiner*—Helene Klemanski
*Attorney, Agent, or Firm*—Oblon, Spivak, McClelland, Maier & Neustadt, P.C.

[57] ABSTRACT

Aqueous dye preparations useful for producing inks for the inkjet process or writing inks or for producing aqueous alcoholic coating or printing colors comprise, based on the weight of the preparation, from 0.1 to 15% by weight of a dye quantity comprising from 90 to 100% by weight of the dye of the formula I

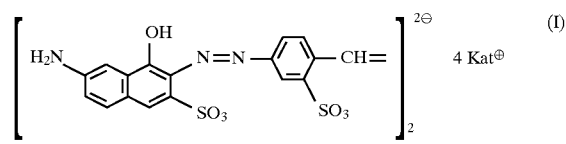

where Kat⊕ is the equivalent of a metal or ammonium ion, from 1 to 40% by weight of carbon black and from 0.1 to 15% by weight of polyethylene glycol.

9 Claims, No Drawings

AQUEOUS DYE PREPARATIONS

The present invention relates to novel aqueous dye preparations comprising, based on the weight of the preparation, from 0.1 to 15% by weight of a dye quantity comprising from 90 to 100% by weight of the dye of the formula I

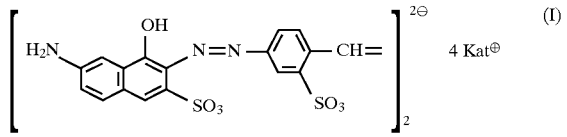

where Kat$^\oplus$ is the equivalent of a metal or ammonium ion, from 1 to 40% by weight of carbon black and from 0.1 to 15% by weight of polyethylene glycol, to the use of these aqueous dye preparations for production of inks for the inkjet process or writing inks or for production of aqueous alcoholic coating or printing colors and also to inks and aqueous alcoholic coating or printing colors each comprising the abovementioned aqueous dye preparations.

U.S. Pat. No. 5,431,723 describes the preparation of the dyes of the formula I and their use in the inkjet process.

The inkjet process is known per se. It involves droplets of a writing fluid (ink) being directed in a specific manner from one or more small nozzles onto a substrate, for example onto paper, wood, textiles, plastic or metal. Electronic control combines the individual droplets into script characters or graphic patterns.

It has been found that the inks described in U.S. Pat. No. 5 431 723 still have application disadvantages, in particular poor water resistance and lightfastness.

It is an object of the present invention to provide liquid, aqueous dye preparations which shall be advantageously suitable for preparing inks for the inkjet process, writing inks or printing colors by virtue of favorable application properties, especially improved water resistance and lightfastness.

We have found that this object is achieved by the dye preparations defined at the beginning.

As observed above, the dye quantity in question consists essentially, i.e. to 90–100% by weight, preferably 95–100% based on the dye quantity, of the dye of the formula I.

The dye preparation may additionally include from 0 to 10% by weight, preferably from 0 to 5% by weight, based on the dye quantity, of one or more shading dyes, for examle C.I. Acid Yellow 23 (19 140), C.I. Acid Blue 9 (42 090), C.I. Direct Red 254, C.I. Direct Blue 86 (74 180), C.I. Reactive Red 24, C.I. Reactive Blue 49, C.I. Reactive Red 72 or the dye-acid of the reaction product of tetrazotized flavonic acid with 1-amino-8-hydroxynaphthalene-3,6-disulfonic acid or 2-hydroxy-3-methylbenzoic acid in each case in a molar ratio of 1:2.

Kat$^\oplus$ in the formula I is the equivalent of a cation and is derived from metal or ammonium ions. Metal ions are in particular the lithium, sodium, potassium, magnesium or calcium ions. Ammonium ions are either substituted or unsubstituted ammonium cations. Substituted ammonium cations include for example monoalkyl-, dialkyl-, trialkyl-, tetraalkyl- or benzyltrialkyl-ammonium cations or those cations which are derived from nitrogenous five- or six-membered saturated heterocycles, such as pyrrolidinium, piperidinium, morpholinium or piperazinium cations or their N-monoalkyl- or N,N-dialkyl-substituted products. Alkyl here generally means straight-chain or branched $C_1$–$C_{20}$-alkyl with or without hydroxyl monosubstitution or disubstitution and/or interruption by from 1 to 3, preferably 1 or 2, oxygen atoms in ether function.

A particular mention is given to triethanolammonium, lithium, sodium or potassium ions, of which particular emphasis is given to lithium or sodium ions and especially triethanolammonium ions.

The dye preparations comprise from 0.1 to 15% by weight, preferably from 0.1 to 8% by weight, in particular from 0.8 to 6% by weight, based on the weight of the preparation, of dye.

A further constituent of the dye preparations of this invention is carbon black. It is advantageous to use carbon black of pigment quality. The particle size of the carbon black particles is generally within the range from 13 to 100 nm. Such products are commercially available and known for example as C.I. Pigment Black 7. Specific examples of commercial products are Printex 95, Printex 90, Printex 85, Printex 80, Printex 75, Printex 45, Printex 40, Printex P, Printex 60, Printex 300, Printex 30, Printex 35, Printex 25, Printex 200, Printex A, Printex G, Printex L6, Printex L, Spezialschwarz 4, Spezialschwarz 5, Spezialschwarz 6, Spezialschwarz 100 or FW 200 (all from Degussa), #2600, #2300, #990, #980, #960, #950, #900, #850, #650, #95, MCF-88, #55, #52, #47, #45, #45L, #44, #40, #33 or #32 (from Mitsubishi Chemicals), Raven 850, Raven 450, Raven 460 or Raven 890 (from Columbian Carbon) or Regal 330R, Regal 415R, Regal 250R, Regal 950R, Monarch 800, Monarch 880, Monarch 900, Monarch 460, Monarch 280 or Monarch 120 (from Cabot).

Preference is given to the use of very finely divided, easy-to-disperse carbon blacks, for example Printex A, Spezialschwarz 4, Spezialschwarz 5, Spezialschwarz 6, FW 200, #2600, #850 or Monarch 900.

Particularly preferred dye preparations comprise Spezialschwarz 4, Spezialschwarz 5, Spezialschwarz 6 or FW 200.

The dye preparations comprise from 1 to 40% by weight, preferably from 5 to 40% by weight, in particular from 5 to 25% by weight, based on the weight of the preparation, of carbon black.

A further constituent of the dye preparation of this invention is polyethylene glycol. Polyethylene glycol for the purposes of this invention is also to be understood as meaning ethoxylated and/or propoxylated ethylenediamine.

Preference is given to polyethylene glycols having an average molecular weight (mass-average) of from 300 to 9000, preferably from 1000 to 6000, in particular from 2000 to 4000.

The dye preparations comprise from 0.1 to 15% by weight, preferably from 0.1 to 6% by weight, in particular from 0.8 to 5% by weight, based on the weight of the preparation, of polyethylene glycol.

Further constituents of the dye preparations of this invention can be for example polypropylene glycols having an average molecular weight (mass-average) of from 400 to 1000, preferably from 500 to 700, especially about 600. When the dye preparations of this invention include propylene glycol, the propylene glycol content will generally be within the range from 0.1 to 15% by weight, preferably within the range from 0.1 to 6% by weight, based on the weight of the preparation.

The dye preparations of this invention should be essentially free from foreign salts. This means for the purposes of the present invention that they may additionally include minor amounts, for example from 0 to 10% by weight, preferably from 0 to 5% by weight, in particular approaching 0% by weight, based on the weight of the preparation, of foreign salts.

Foreign salts in this context are to be understood as generally meaning those salts which can arise in the course of the synthesis (azo coupling) of the dyes of the formula I, for example sodium chloride, potassium chloride, sodium sulfate or potassium sulfate.

The balance to 100% by weight is generally water in the dye preparation of this invention.

Particularly good results are obtained with aqueous dye preparations in which the weight ratio of carbon black:dye is not less than 6:1.

A particularly advantageous aqueous dye preparation comprises, based on the weight of the preparation, from 1 to 5% by weight of dye, from 5 to 25% by weight of carbon black and from 1 to 5% by weight of polyethylene glycol.

In addition, emphasis is also given to those aqueous dye preparations in which the individual parameters are selected from a combination of the above-recited preferred parameters.

The aqueous dye preparations of this invention are advantageously useful for production of inks for the inkjet process or writing inks or of aqueous alcoholic coating or printing colors.

Such inks are obtained on diluting the aqueous dye preparations of this invention with water or with mixtures of water and water-miscible organic solvents.

Examples of suitable water-miscible organic solvents are $C_1$–$C_4$-alkanols, such as methanol, ethanol, propanol, isopropanol, butanol, isobutanol, sec-butanol or tert-butanol, carboxamides, such as N,N-dimethylformamide or N,N-dimethylacetamide, lactams, such as ε-caprolactam, 2-pyrrolidinone or N-methyl-2-pyrollidinone, urea, cyclic ureas, such as 1,3-dimethyl-2-imidazolidinone or 1,3-dimethyl-2-hexahydropyrimidone, ketones or ketoalcohols, such as acetone, methyl ethyl ketone or 2-methyl-2-hydroxy-4-pentanone, ethers, such as tetrahydrofuran or dioxane, mono-, oligo- or polyalkylene glycols or thioglycols containing $C_2$–$C_6$-alkylene units, such as ethylene glycol, 1,2- or 1,3-propylene glycol, 1,2- or 1,4-butylene glycol, 1,6-hexanediol, diethylene glycol, triethylene glycol, dipropylene glycol, thiodiglycol, polyethylene glycol or polypropylene glycol, other polyols, such as glycerol or 1,2,6-hexanetriol, $C_1$–$C_4$-alkyl ethers of polyhydric alcohols, such as ethylene glycol monomethyl or monoethyl ether, diethylene glycol monomethyl or monoethyl ether or triethylene glycol monomethyl or monoethyl ether, γ-butyrolactone or dimethyl sulfoxide.

Examples of preferred water-miscible organic solvents are 2-pyrrolidinone, N-methyl-2-pyrrolidinone, mono-, di- or trialkylene glycols containing $C_2$–$C_6$-alkylene units, especially mono-, di- or triethylene glycol or dipropylene glycol, or dimethyl sulfoxide. Very particular emphasis is given to N-methyl-2-pyrrolidinone, diethylene glycol or dimethyl sulfoxide.

The aqueous alcoholic coating or printing colors are obtained when the dye preparation of this invention is diluted with a $C_1$–$C_4$-alkanol, with or without further addition of water, and optionally admixed with commercially available binders.

The inks or coating or printing colors of this invention comprise as a rule from 2 to 50% by weight, preferably 15 to 30% by weight, based on the weight of the ink or color, of a dye preparation of this invention.

The inks or coating or printing colors of this invention further comprise as a rule from 75 to 98% by weight, preferably from 80 to 94.9% by weight, in particular from 86 to 93% by weight, based on the weight of the ink or color, of water.

The inks of this invention comprise from 0 to 30% by weight, preferably from 5 to 15% by weight, based on the weight of the ink, of one or more water-miscible organic solvents.

The coating or printing colors of this invention comprise as a rule from 1 to 70% by weight, preferably from 10 to 30% by weight, based on the weight of the color, of $C_1$–$C_4$-alkanol.

Further possible constituents of the inks or coating or printing colors of this invention are for example auxiliaries, such as anionic, cationic or nonionic surfactants, conducting salts, fungicides, bactericides, corrosion inhibitors or perfume oils. The proportion of these components is generally within the range from 0 to 10% by weight, preferably within the range from 0 to 5% by weight, based on the weight of the ink or color. The inks or coating or printing colors of this invention are notable for high water resistance and lightfastness in use.

The dye preparations of this invention are likewise useful as marker fluids in writing implements, as aqueous liquid toners or as base materials for coating compositions, for example wood stain, ink ribbon colors, stamp-pad inks or ball pen pastes. They are also useful for pulp-coloring paper.

The Examples which follow illustrate the preparations of this invention and their applications. Parts are by weight.

EXAMPLE 1 a) 100 g of a gas carbon black with particle sizes of 25 nm, 10 g of the triethanolamine salt of the dye of the formula I and 380 ml of water were mixed for about 5 min in a 1 L stirred metal beaker and then transferred into a dispersing apparatus (Dispermat SL 603). This dispersing apparatus was equipped with 100 ml of glass balls (diameter 1 mm). The milling power was set to 70%, the pumping power to 30%. The mixture was treated for 10 min under these conditions.

Thereafter 10 g of a polyethylene glycol having an average molecular weight of 4000 were added and the mixture was finely dispersed in the dispersing apparatus for 4 h under the above-specified conditions. The suspension was then discharged via a sieve having a mesh size of 46 μm. The concentration of the dye of the formula I in the preparation is 2% by weight, that of the carbon black 20%.

To produce an inkjet ink, 25 parts of the preparation described under a), 10 parts of N-methylpyrrolidone (NMP) and 65 parts of water were thoroughly mixed. The pH was adjusted to 7.5 with triethanolamine, and the ink formulation was then filtered off with suction through a 1 μm Teflon filter cartridge and thereafter devolatilized under reduced pressure. The ready-to-use ink is transferred to a commercial inkjet cartridge (HP 51626 A from Hewlett-Packard) and thereafter tested in a commercially available inkjet printer (Deskjet 500 C from Hewlett-Packard) on commercially available Xerox 4024 standard paper.

The prints obtained were examined in respect of optical density, water fastness, lightfastness, marker fastness and rubfastness. The appearance of the print was assessed visually.

The optical density (OD) was determined using a measuring instrument from Gretag (model 169), on solid areas printed onto two varieties of paper.

The water fastness was determined by dipping a standard paper printed with a solid area into a water-containing beaker for 5 min while stirring the liquid at 100 rpm. Thereafter the paper was removed from the water and dried, and the OD was determined again. The difference between the pre-treatment OD and the post water treatment OD is a measure of the water fastness. The smaller the ΔOD, the better the water fastness.

The lightfastness was tested by 48 hours' irradiation of a black solid area with a xenon lamp (100 W).

The marker fastness was tested by highlighting a line of print with a marker pen. The less the print smudges, the better the marker fastness.

The cogation test was carried out by issuing 10 times 1 million pulses to eject inkjet droplets to all nozzles of a commercially available cartridge (51 626 from Hewlett-Packard). Satisfactory cogation-test performance requires that the mass of expelled ink be constant after every measurement; if not, this stability test indicates a change in the printing behavior of the ink.

The appearance of the prints was visually assessed according to the criteria of uniformity of a solid area, sharpness of lines, color quality and strikethrough of the ink through the paper.

EXAMPLE 2 (COMPARATIVE)

a) 100 g of the gas carbon black used in Example 1, 390 ml of water and 10 g of a polyethylene glycol having an average molecular weight of 4000 were mixed in a 1 L stirred metal beaker for about 5 min. A highly viscous mass was obtained.

b) 25 parts of this mass were diluted with 10 parts of NMP and 65 parts of water, and this ink formulation, with a carbon black content of 5%, was treated in the dispersing apparatus described in Example 1, under the conditions described there. The ink was then discharged through a sieve having a mesh size of 46 μm. This comparative ink contains no dye of the formula I. The concentration of the carbon black is 5% by weight, as in Example 1. The ink is completely unstable and flocculates. Inkjet printing is not possible.

EXAMPLE 3 (COMPARATIVE)

a) 10 g of the dye used in Example 1 were dissolved in 490 g of water and adjusted to pH 7.5 with triethanolamine.

b) 25 parts of this preparation were diluted with 10 parts of NMP and 65 parts of water as described in Example 1. The solution was applied in an inkjet cartridge and tested, both steps being carried out as described in Example 1.

The test results of Examples 1 to 3 are shown below in Table 1.

TABLE 1

| Prints with the Hewlett-Packard Deskjet 500 C Inkjet Printer | Example 1 | Example 2 | Example 3 |
| --- | --- | --- | --- |
| pH | 7.5 | 7.5 | 7.5 |
| Optical Density OD | 2.78 | — | 0.9 |
| Water fastness ΔOD | 0.05 | — | 0.04 |
| Lightfastness ΔOD | 0.1 | — | 0.26 |
| Marker fastness | good | — | not acceptable |
| Cogation test | good | — | good |
| Appearance | jet black (good) | — | pale, bluish-violet (not acceptable) |

EXAMPLE 4 a) 100 g of a furnace carbon black having a particle size of 25 nm, 10 g of a disazo dye mixture obtained by tetrazotization of flavonic acid and coupling with a mixture of 1-amino-8-hydroxynaphthalene-3,6-disulfonic acid, 2-amino-8-hydroxynaphthalene-6-sulfonic acid and 2-hydroxy-3-methylbenzoic benzoic acid, and 380 g of water were mixed in a 1 L stirred metal beaker for about 5 min, then transferred into the dispersing apparatus described in Example 1 and treated therein under the conditions described there for 10 min. Thereafter 10 g of polyethylene glycol having an average molecular weight of 4000 were added and the mixture was finely dispersed under the above-specified conditions for 4 h. The suspension was then discharged through a sieve having a mesh size of 46 μm. The concentration of the dye mixture was 2%.

b) To produce an inkjet ink, 25 parts of the above-described preparation, 10 parts of NMP and 65 parts of water were thoroughly mixed. The pH was adjusted to 7.5 with triethanolamine, the ink formulation was then filtered off with suction through a 1 μm Teflon filter cartridge and thereafter devolatilized under reduced pressure. The ready-to-use ink was then transferred into an inkjet cartridge and tested as described in Example 1.

EXAMPLE 5 a) 10 g of the dye used in Example 1 (but in the form of the lithium salt) were stirred into 56 g of a 36% strength by weight aqueous carbon black preparation containing 8% by weight of an ethoxylated and then propoxylated ethylenediamine having an average molecular weight of 7500. Thereafter 34 ml of water were added, and the mixture was then treated in the dispersing apparatus described in Example 1 for 4 h.

b) To produce an inkjet ink, 25 parts of the above-described preparation, 10 parts of NMP and 65 parts of water were thoroughly mixed. The pH was adjusted to 7.5 with 1% strength by weight aqueous lithium hydroxide solution, the ink formulation was then filtered off with suction through a 1 μm Teflon filter cartridge and thereafter devolatilized under reduced pressure. The ready-to-use ink was then tested as described in Example 1.

EXAMPLE 6 a) 10 g of the dye used in Example 1 (but in the form of the lithium salt) and 10 g of the polyethylene glycol used in Example 1 were stirred into 56 g of a 36% strength by weight aqueous carbon black preparation containing 8% by weight of an ethoxylated and then propoxylated ethylenediamine having an average molecular weight of 7500. Thereafter 324 ml of water were added, and the mixture was then treated in the dispersing apparatus described in Example 1 for 4 h.

b) To produce an inkjet ink, 25 parts of the above-described preparation, 10 parts of NMP and 65 parts of water were thoroughly mixed. The pH was adjusted to 7.5 with 1% strength by weight aqueous lithium hydroxide solution, the ink formulation was then filtered off with suction through a 1 μm Teflon filter cartridge and thereafter devolatilized under reduced pressure. The ready-to-use ink was then tested as described in Example 1.

The test results of Examples 4 to 6 are shown below in Table 2.

TABLE 2

| Prints with the Hewlett-Packard Deskjet 500 C Inkjet Printer | Example 4 | Example 5 | Example 6 |
| --- | --- | --- | --- |
| Optical density OD | 2.67 | 1.2 | 1.13 |
| Water fastness ΔOD | 0.05 | 0.04 | 0.01 |
| Lightfastness ΔOD | 0.1 | 0.06 | 0.03 |
| Marker fastness | good | deficient | not acceptable |

TABLE 2-continued

| Prints with the Hewlett-Packard Deskjet 500 C Inkjet Printer | Example 4 | Example 5 | Example 6 |
|---|---|---|---|
| Cogation test | good | not acceptable | not acceptable |
| Appearance | jet black (good) | spotty, brown, strikes through (not acceptable) | spotty, brown, strikes through (not acceptable) |

We claim:

1. An aqueous dye preparation comprising, based on the weight of the preparation, from 0.1 to 15% by weight of a dye quantity comprising from 90 to 100% by weight of the dye of the formula I

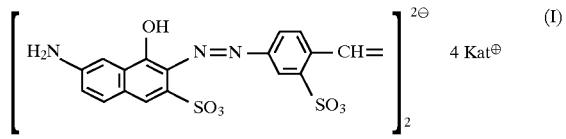

where Kat$^\oplus$ is the equivalent of a metal or ammonium ion, from 1 to 40% by weight of carbon black and from 0.1 to 15% by weight of polyethylene glycol.

2. An aqueous dye preparation as claimed in claim 1, comprising polyethylene glycol having an average molecular weight of from 300 to 9000.

3. An aqueous dye preparation as claimed in claim 1, comprising from 0.1 to 8% by weight, based on the weight of the preparation, of dye.

4. An aqueous dye preparation as claimed in claim 1, comprising from 5 to 40% by weight, based on the weight of the preparation, of carbon black.

5. An aqueous dye preparation as claimed in claim 1, comprising from 0.1 to 6% by weight, based on the weight of the preparation, of polyethylene glycol.

6. A method for producing an ink comprising combining an aqueous dye preparation as claimed in claim 1 with water or a mixture of water and a water-miscible organic solvent.

7. An ink comprising an aqueous dye preparation as claimed in claim 1, water or a mixture of water and a water-miscible organic solvent.

8. A method for producing an aqueous alcoholic coating or printing color comprising combining an aqueous dye preparation as claimed in claim 1 with water and at least one $C_1$–$C_4$-alkanol.

9. An aqueous alcoholic coating or printing color comprising an aqueous dye preparation as claimed in claim 1, water and at least one $C_1$–$C_4$-alkanol.

* * * * *